(12) United States Patent
Agasar et al.

(10) Patent No.: US 12,111,736 B1
(45) Date of Patent: Oct. 8, 2024

(54) SELF-SERVICE RESOLUTION OF UNHEALTHY SDNAS OBJECTS

(71) Applicant: Dell Products, L.P., Hopkinton, MA (US)

(72) Inventors: Mahadev Agasar, Rabkavi (IN); Hemanth Dasan, Bangalore (IN)

(73) Assignee: Dell Products, L.P., Hopkinton, MA (US)

( * ) Notice: Subject to any disclaimer, the term of this patent is extended or adjusted under 35 U.S.C. 154(b) by 28 days.

(21) Appl. No.: 18/136,393

(22) Filed: Apr. 19, 2023

(51) Int. Cl.
  *G06F 11/00* (2006.01)
  *G06F 11/14* (2006.01)
  *G06F 16/182* (2019.01)

(52) U.S. Cl.
  CPC ...... *G06F 11/1469* (2013.01); *G06F 16/1827* (2019.01); *G06F 2201/80* (2013.01)

(58) Field of Classification Search
  CPC ............. G06F 11/1469; G06F 11/0727; G06F 11/0793; G06F 11/1448; G06F 11/3034; G06F 16/1827; G06F 2201/80
  See application file for complete search history.

(56) References Cited

U.S. PATENT DOCUMENTS

| | | | |
|---|---|---|---|
| 10,860,610 B1* | 12/2020 | Scott | G06F 16/275 |
| 2009/0217345 A1* | 8/2009 | Backa | H04L 67/1097 726/1 |
| 2016/0232058 A1* | 8/2016 | Starr | G06F 11/1461 |
| 2017/0090779 A1* | 3/2017 | Barzik | G06F 11/3034 |
| 2022/0129350 A1* | 4/2022 | Sharma | G06F 11/3034 |

* cited by examiner

*Primary Examiner* — Joseph D Manoskey
(74) *Attorney, Agent, or Firm* — Anderson Gorecki LLP (57) ABSTRACT

A storage system management application User Interface (UI) includes an unhealthy SDNAS object resolution page. A set of SDNAS objects having an unhealthy status is determined from an SDNAS process executing on a base platform. Each unhealthy SDNAS object is identified, and a recovery process for the unhealthy SDNAS object is determined. The set of unhealthy SDNAS objects and the recovery procedures are returned to the unhealthy SDNAS object resolution page of the UI. Controls are provided on the page to receive input related to selection of a single unhealthy SDNAS object, a group of two or more unhealthy SDNAS objects, or all unhealthy SDNAS objects for resolution. In response to selection of one or more unhealthy SDNAS objects, the user interface provides a series of one or more API calls to the base platform to effect resolution of the selected unhealthy SDNAS objects via the SDNAS process.

20 Claims, 8 Drawing Sheets

| Object Type | Unhealthy Object State | Recovery Method |
|---|---|---|
| SDNAS Object Recovery Procedure Data Structure 265 | | |
| | 500 | 505 | 510 |

| Object Type | Unhealthy Object State | Recovery Method |
|---|---|---|
| SDNAS object type = File System | SDNAS object state 1 | SDNAS API sequence 1 |
| | SDNAS object state 2 | SDNAS API sequence 2 |
| | ⋮ | ⋮ |
| | SDNAS object state N | SDNAS API sequence N |
| SDNAS object type = NAS server | SDNAS object state 1 | SDNAS API sequence 1 |
| | SDNAS object state 2 | SDNAS API sequence 2 |
| | ⋮ | ⋮ |
| | SDNAS object state N | SDNAS API sequence N |
| SDNAS object type = Snapshot | SDNAS object state 1 | SDNAS API sequence 1 |
| | SDNAS object state 2 | SDNAS API sequence 2 |
| | ⋮ | ⋮ |
| | SDNAS object state N | SDNAS API sequence N |
| ⋮ | | |

SELF-SERVICE RESOLUTION OF UNHEALTHY SDNAS OBJECTS

FIELD

This disclosure relates to computing systems and related devices and methods, and, more particularly, to a method and apparatus for enabling self-service resolution of unhealthy Software Defined Network Attached Storage (SDNAS) objects.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, a method and apparatus for enabling self-service resolution of unhealthy Software Defined Network Attached Storage (SDNAS) objects is provided. A user interface to a storage system management system is configured to include an unhealthy SDNAS object resolution page. The storage system management system queries a base platform on which an SDNAS process is operating for a list of unhealthy SDNAS objects. The base platform queries the SDNAS for its status, to determine if the SDNAS process is able to accurately report the status of SDNAS objects. For example, if the SDNAS process is currently undergoing maintenance or an upgrade process, the SDNAS process may not be able to accurately report the status of the SDNAS objects on the base platform.

If the SDNAS process is currently available, the SDNAS process is queried for a set of SDNAS objects that have an unhealthy status. Example SDNAS objects might include NAS servers, filesystems, snapshots, and other objects created by the SDNAS process in connection with providing NAS services to hosts. Each SDNAS object that has an unhealthy state is identified, and a recovery process specific to the object type and unhealthy state is determined. The recovery process, in some embodiments, is a set of API calls on the SDNAS process to instruct the SDNAS process to implement a series of steps on the SDNAS object to change the state of the SDNAS object from unhealthy to healthy.

The set of unhealthy SDNAS objects and the recovery procedures for each of the unhealthy SDNAS objects is returned to the User Interface, and used to populate the unhealthy SDNAS object resolution page of the UI. Controls are provided to receive input related to selection of a single unhealthy SDNAS object, a group of two or more unhealthy SDNAS objects, or all unhealthy SDNAS objects for resolution. In some embodiments, the unhealthy SDNAS object resolution page also includes controls to receive input to start recovery of selected unhealthy SDNAS objects immediately or at a delayed specified future point in time. In response to selection of the unhealthy SDNAS objects, the user interface provides a series of one or more API calls to the base platform to effect resolution of the selected unhealthy SDNAS objects via the SDNAS process.

In some embodiments, a method of self-service resolution of unhealthy Software Defined Network Attached Storage (SDNAS) objects, includes determining a state of a SDNAS process by a base platform on which the SDNAS process is implemented, to determine if the SDNAS process is capable of providing accurate information about a set of SDNAS objects used by the SDNAS process. In response to a determination that the SDNAS process is capable of providing accurate information about the set of SDNAS objects, querying the SDNAS process for a subset of SDNAS objects having an unhealthy status, and receiving a response from the SDNAS process, the response identifying the subset of SDNAS objects having the unhealthy status. The method further includes determining a recovery process for each SDNAS object in the subset of SDNAS objects, populating an unhealthy SDNAS object resolution page of a user interface to a storage system management application, and in response to input to the unhealthy SDNAS object resolution page selecting one of the SDNAS objects of the subset of SDNAS objects, and initiating self-service resolution of the selected one of the SDNAS objects using the recovery process for the selected one of the SDNAS objects.

In some embodiments, the SDNAS process is implemented in a container on the base platform. In some embodiments, the SDNAS objects include NAS servers, shared filesystems, and snapshots of the shared filesystems.

In some embodiments, the recovery process specifies an ordered set of API calls to be implemented by the base platform on an API of the SDNAS process to effect resolution of the selected one of the SDNAS objects.

In some embodiments, receiving the response from the SDNAS process and determining the recovery process for each SDNAS object in the subset of SDNAS objects are implemented by the base platform. In some embodiments the method further includes transmitting the subset of SDNAS objects and respective recovery process for each SDNAS object in the subset of SDNAS objects from the base platform to the user interface to the storage system management application. In some embodiments the method further includes maintaining a SDNAS object recovery procedure data structure by the base platform correlating SDNAS object type, SDNAS unhealthy object state, and SDNAS object recovery procedure methods.

In some embodiments, the user interface to the storage system management application contains a set of controls enabling selection of one unhealthy SDNAS object for recovery or enabling selection of multiple unhealthy SDNAS objects for simultaneous recovery.

In some embodiments, receiving the response from the SDNAS process is implemented by the base platform, and determining the recovery process for each SDNAS object in the subset of SDNAS objects is implemented by the user interface. In some embodiments the method further includes maintaining a SDNAS object recovery procedure data structure by the user interface correlating SDNAS object type, SDNAS unhealthy object state, and SDNAS object recovery procedure methods.

In some embodiments, a system for self-service resolution of unhealthy Software Defined Network Attached Storage (SDNAS) objects, includes one or more processors and one or more storage devices storing instructions that are operable, when executed by the one or more processors, to cause the one or more processors to perform operations including determining a state of a SDNAS process by a base platform on which the SDNAS process is implemented, to determine if the SDNAS process is capable of providing accurate information about a set of SDNAS objects used by the SDNAS process and, in response to a determination that the SDNAS process is capable of providing accurate information about the set of SDNAS objects, querying the SDNAS process for a subset of SDNAS objects having an unhealthy status. The operations further include receiving a response from the SDNAS process, the response identifying the subset of SDNAS objects having the unhealthy status, determining a recovery process for each SDNAS object in the subset of SDNAS objects, populating an unhealthy SDNAS object resolution page of a user interface to a storage system management application, and in response to input to the unhealthy SDNAS object resolution page selecting one of the SDNAS objects of the subset of SDNAS objects, and initiating self-service resolution of the selected one of the SDNAS objects using the recovery process for the selected one of the SDNAS objects.

In some embodiments, the SDNAS process is implemented in a container on the base platform. In some embodiments, the SDNAS objects include NAS servers, shared filesystems, and snapshots of the shared filesystems.

In some embodiments, the recovery process specifies an ordered set of API calls to be implemented by the base platform on an API of the SDNAS process to effect resolution of the selected one of the SDNAS objects.

In some embodiments, receiving the response from the SDNAS process and determining the recovery process for each SDNAS object in the subset of SDNAS objects are implemented by the base platform. In some embodiments, the operations further include transmitting the subset of SDNAS objects and respective recovery process for each SDNAS object in the subset of SDNAS objects from the base platform to the user interface to the storage system management application. In some embodiments, the operations further include maintaining a SDNAS object recovery procedure data structure by the base platform correlating SDNAS object type, SDNAS unhealthy object state, and SDNAS object recovery procedure methods.

In some embodiments, the user interface to the storage system management application contains a set of controls enabling selection of one unhealthy SDNAS object for recovery or enabling selection of multiple unhealthy SDNAS objects for simultaneous recovery.

In some embodiments, receiving the response from the SDNAS process is implemented by the base platform, and determining the recovery process for each SDNAS object in the subset of SDNAS objects is implemented by the user interface. In some embodiments, the operations further include maintaining a SDNAS object recovery procedure data structure by the user interface correlating SDNAS object type, SDNAS unhealthy object state, and SDNAS object recovery procedure methods.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
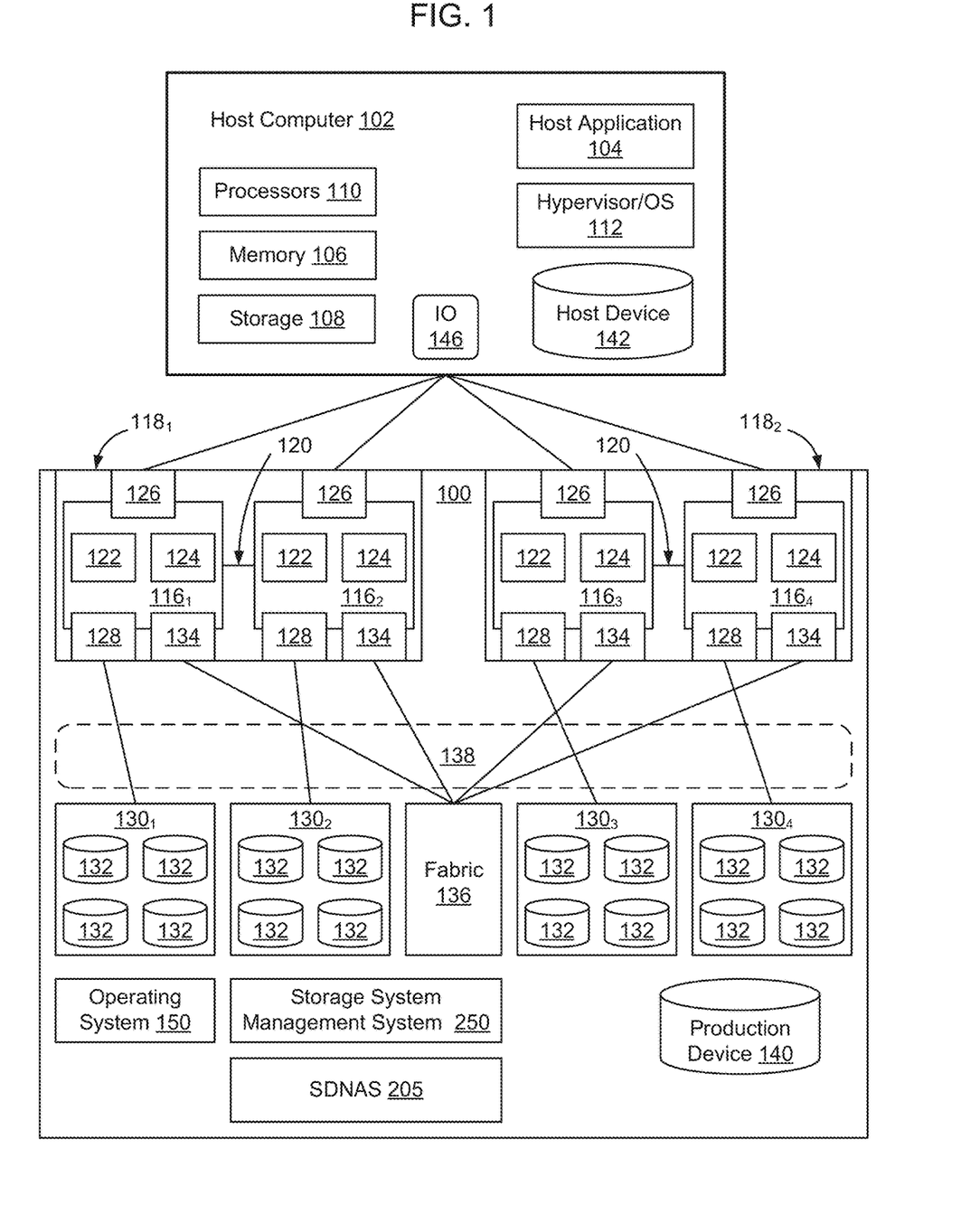
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. In some embodiments, the communication links 120 are implemented as a PCIe NTB. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using PCIe (Peripheral Component Interconnect Express) or InfiniBand. Each compute node 116 may allocate a portion or partition of its respective local volatile memory 124 to a virtual shared memory 138 that can be accessed by other compute nodes 116 over the PCIe NTB links.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g., in the virtual shared memory 138 or on managed drives 132. If the commanded data is not in the virtual shared memory 138, then the data is temporarily copied into the virtual shared memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared memory 138, marks the data as dirty, and creates new metadata that maps the address of the data on the production device 140 to a location to which the block is written on the managed drives 132.

In some embodiments, storage resources of storage system are implemented to be accessed by hosts 102 using Software Defined Network Attached Storage (SDNAS). Software Defined Network Attached Storage, as that term is used herein, refers to a set of tightly connected SDNAS nodes that work together so that, in many respects, they can be viewed as a single system/layer. SDNAS nodes are also referred to herein as "data nodes". A given SDNAS cluster has two or more data nodes, each of which is configured to implement the same tasks, as controlled and scheduled by the SDNAS software. Each data node implements a NAS server, which provides access to one or more filesystems.

Figure 2:
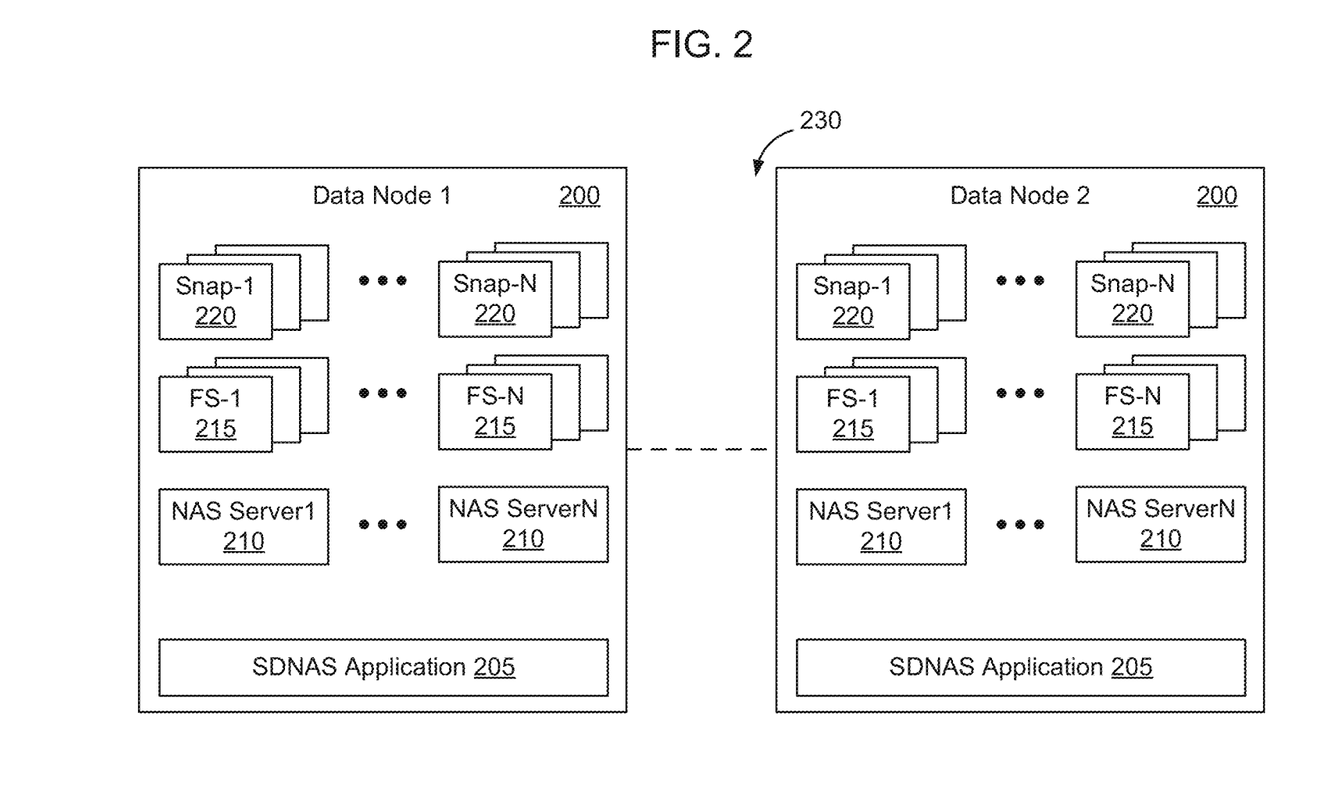
FIG. 2 is a functional block diagram an example Network Attached Storage (NAS) cluster having a pair of data nodes, according to some embodiments.

FIG. 2 is a functional block diagram of an example storage cluster 230 including two data nodes 200, data node 1 and data node 2. As used herein, the term "cluster" is used to refer to a group of two or more data nodes 200 that have concurrent access to one or more shared user filesystems. Although FIG. 2 shows some embodiments in which the cluster 230 includes a pair of data nodes 200, it should be understood that a given cluster 230 may include more than two data nodes 200. In instances where a filesystem is a shared filesystem, data nodes 200 provide concurrent access to the filesystem such that a host 102 can connect to any data node 200 to mount one or more of the filesystems 215.

As shown in FIG. 2, in some embodiments, each data nodes 200 has an SDNAS application 205 and one or more NAS servers 210. Each NAS server 210 provides access to one or more filesystems 215, each of which may be concurrently accessible shared filesystems or some of which may be user filesystems that are accessible only on a particular data node 200. Snapshots 220 are created from filesystems 215 and, in some embodiments, the snapshots 220 are point-in-time representations of the filesystems 215. The NAS servers 210, filesystems 215, and snapshots 220, are referred to herein as "SDNAS objects" 280, although other types of SDNAS objects 280 may exist as well depending on the implementation.

Each storage cluster 230 is implemented using a set of two or more data nodes 200. Each data node 200 hosts one or more NAS servers 210 and has a set of host IO interfaces to provide access to the NAS servers 210 to hosts 102. An example host IO interface may be a logical or physical Ethernet port, although other types of physical or logical interfaces may be implemented on the data nodes 200 depending on the implementation.

A NAS server 210 is a logical entity that exists inside the SDNAS container, and which hosts one or more filesystems 215. An example container may be a Docker container, although other types of containers may be used as well depending on the implementation. In embodiments where Docker containers are used to host the SDNAS process and NAS servers, each data node 200 will also include an instance of Docker Engine (not shown).

Each NAS server has a unique name, one or more IO addresses, and exposes NAS protocols such as Network File Server (NFS), Server Message Block (SMB), File Transfer Protocol (FTP), and Secure File Transfer Protocol (SFTP). Naming services, such as Domain Name Service (DNS), Lightweight Directory Access Protocol (LDAP), and Network Information Service (NIS), are configured on a NAS server. Users and groups may be defined locally, with local files. A NAS server runs by default on the primary data node 200 of a storage cluster 230. In the case of a data node failure, the NAS server 210 is moved automatically from the primary data node to a backup data node within the SDNAS cluster.

A filesystem 215 is a storage resource that can be accessed through file sharing protocols supported by the NAS server, such as NFS or SMB. Snapshots 220 are point-in-time copies of data stored on a storage resource. For example, a snapshot can be created that represents a point-in-time copy of a particular filesystem 215 or set of filesystems. A user can recover files from a snapshot or restore a storage resource from a snapshot.

As shown in FIG. 2, a given storage cluster has multiple components, each of which is referred to herein as a "SDNAS object" 280. As noted above, example SDNAS objects 280 include NAS servers 210, filesystems 215, and snapshots 220, although other SDNAS objects 280 may also be created depending on the implementation.

Occasionally, one or more of the SDNAS objects 280 fails or otherwise encounters an unhealthy state, which can affect access by the hosts to the storage resources 130 of storage system 100.

Conventionally, storage systems have included a storage system management application 250 that a user can use to access the storage system 100 and configure aspects of the storage system 100. Unfortunately, the storage system management application does not include a user interface to the SDNAS process 205, for example to enable the user to identify and resolve unhealthy SDNAS objects 280. When a SDNAS object 280 was identified as unhealthy, resolution of the unhealthy SDNAS object 280 required customer service to be contacted to manually intervene to implement a recovery procedure. Requiring an engineering team to become involved to resolve unhealthy SDNAS objects 280 can result in the SDNAS object 280 being inaccessible for an extended period of time. In instances where there are multiple SDNAS objects 280 that are determined to be unhealthy, which might simultaneously exist on multiple data nodes, recovering unhealthy SDNAS objects 280 can be a lengthy and tedious process.

According to some embodiments, a storage system management application 250 is configured to enable self-service resolution of unhealthy Software Defined Network Attached Storage (SDNAS) objects 280. Example unhealthy SDNAS objects 280 and the effect of the unhealthy state are shown in Table I, although it should be understood that other types of SDNAS objects 280 may exist, and the particular effect a given unhealthy state of an SDNAS object 280 may have on the storage system 100 will depend on the particular implementation:

TABLE I

| Unhealthy Object Type | Impact |
| --- | --- |
| Unmounted Filesystem | User cannot access filesystem data until filesystem is mounted |
| Offline Filesystem | User cannot access filesystem data until filesystem is back online |
| Corrupted Filesystem/ NAS Server | User cannot access data until filesystem/NAS server is recovered |
| NAS Server offline | User cannot access the data through the NAS server until the NAS server is online |
| Stale entries | Upgrades blocked. Example stale entries might include dangling McVLANs, bad snapshots, etc. |
| 100% filled filesystem | Upgrades blocked |

During normal operation, if one of these types of unhealthy SDNAS objects is encountered or if another type of unhealthy SDNAS object 280 is encountered, the amount of time that it takes to recover will be based on the disasters/critical conditions/recovery procedures that are required to be performed. For example, if one or more of these unhealthy SDNAS objects is discovered during an upgrade procedure, which often occurs during a window of data unavailability, identifying the unhealthy SDNAS object 280 and recovering the unhealthy SDNAS object 280 can unduly extend the window of data unavailability. Further, in some instances multiple unhealthy SDNAS may be identified, which can require a time consuming tedious manual recovery process.

Figure 3:
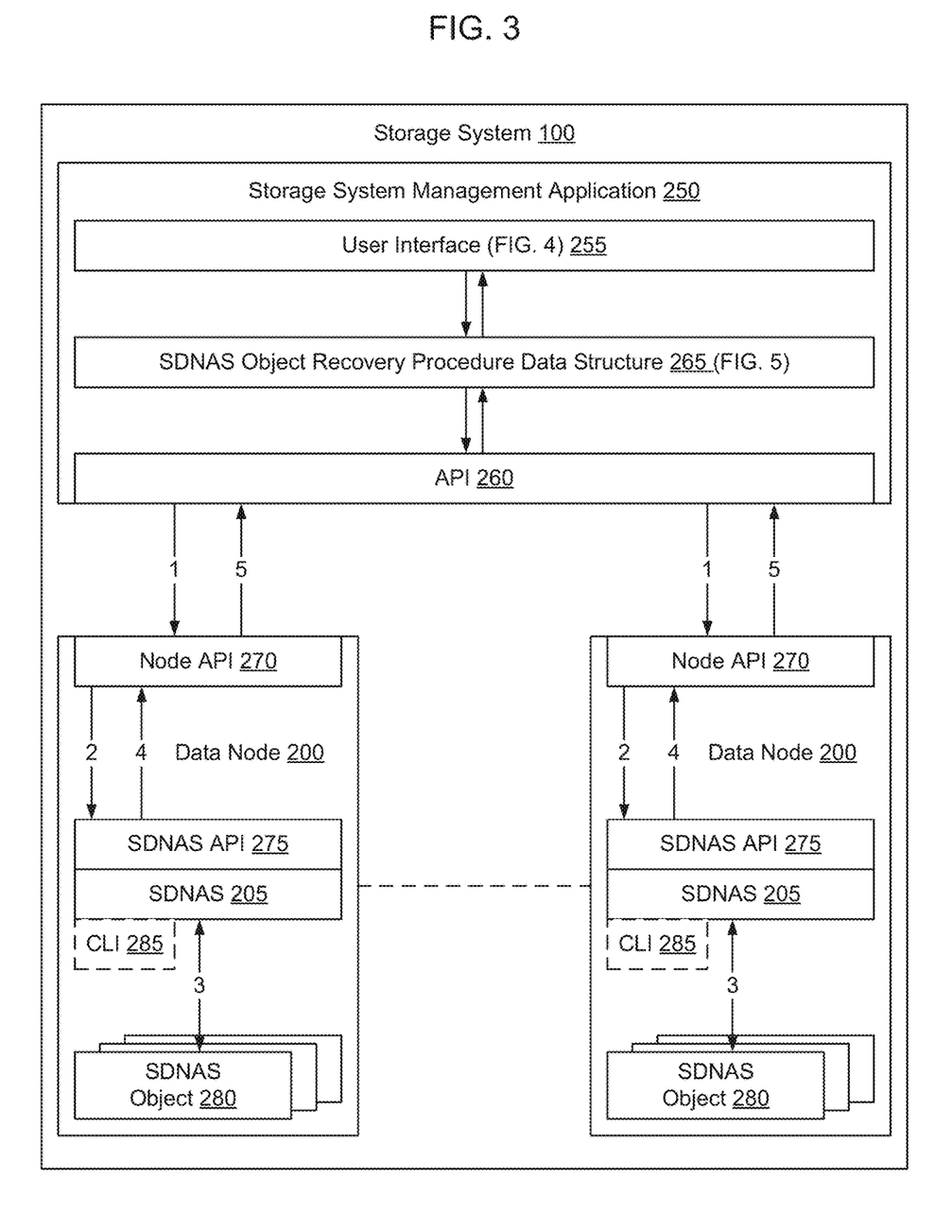
FIG. 3 is a block diagram of an example storage system including a plurality of data nodes and a storage system management application configured to enable self-service resolution of unhealthy Software Defined Network Attached Storage (SDNAS) objects, according to some embodiments.
Figure 4:
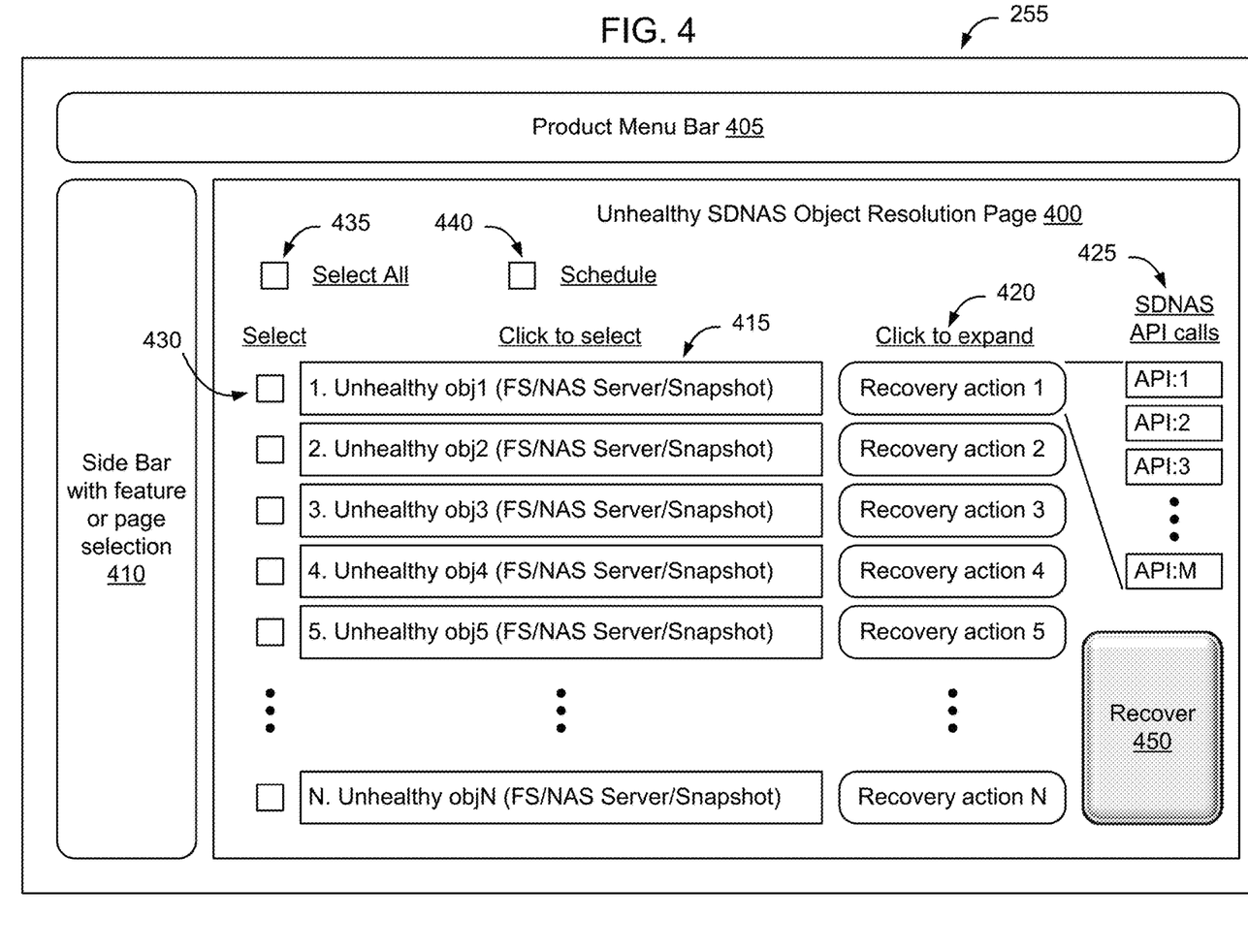
FIG. 4 is a block diagram of an example portion of a user interface of the storage system management application of FIG. 3, showing a user interface page configured to enable self-service resolution of unhealthy SDNAS objects, according to some embodiments.

FIG. 3 is a block diagram of an example storage system 100 including a plurality of data nodes 200 and a storage system management application 250 configured to enable self-service resolution of unhealthy Software Defined Network Attached Storage (SDNAS) objects 280, according to some embodiments. According to some embodiments, as shown in FIG. 3, a storage system management application 250 on storage system 100 has a user interface 255, an example of which is shown in FIG. 4. The user interface 255, in some embodiments, is used to enable the storage system management application 250 to interact with data nodes 200 to identify unhealthy SDNAS objects and enable self-service recovery by the user of the unhealthy SDNAS objects.

Figure 5:
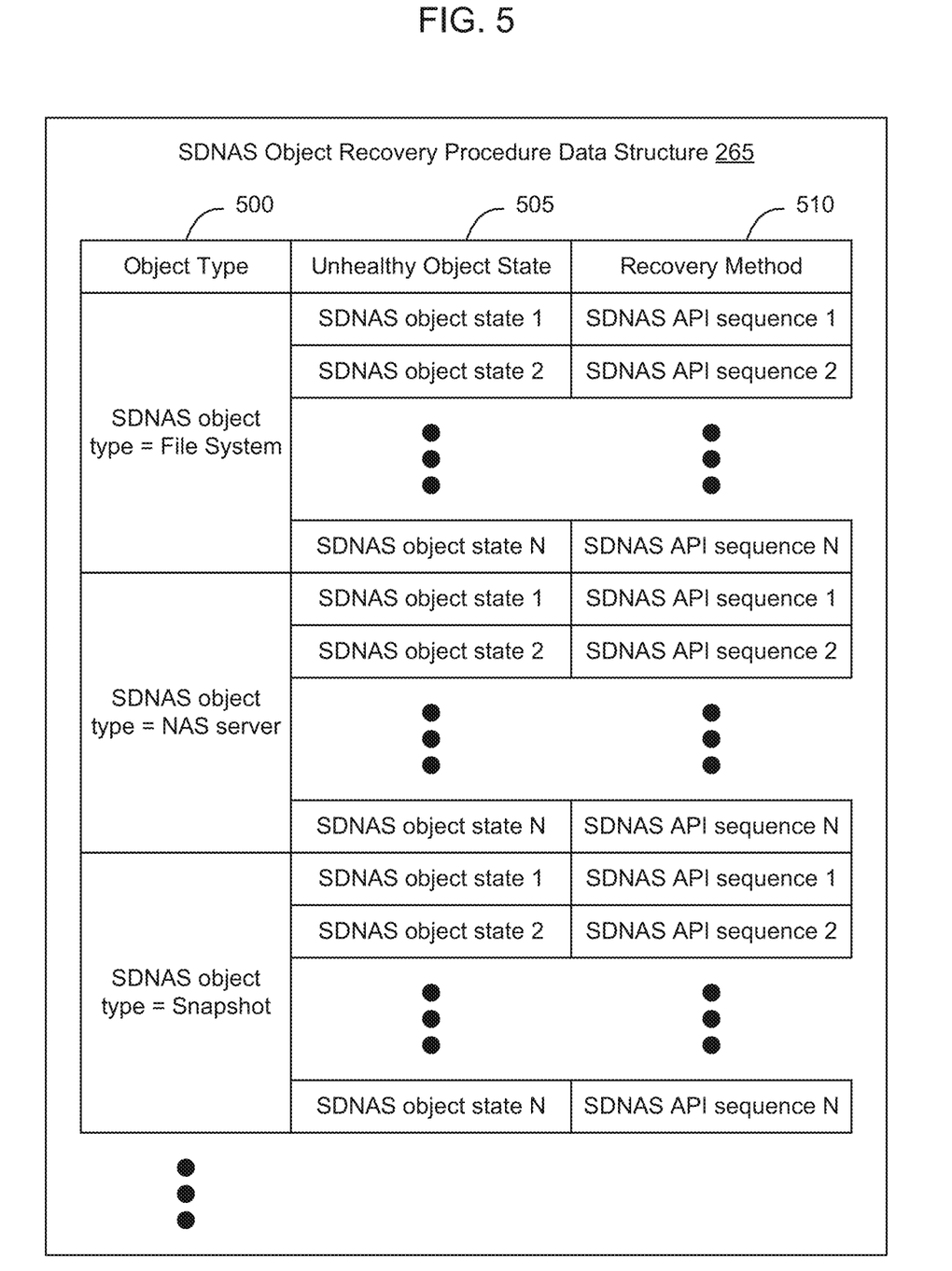
FIG. 5 is a block diagram of an example SDNAS object recovery procedure data structure for use by the storage system management application of FIG. 3, according to some embodiments.

In some embodiments, the storage system management application includes a SDNAS object recovery procedure data structure 265, an example of which is shown in FIG. 5. The SDNAS object recovery procedure data structure 265 receives a list of unhealthy SDNAS objects 280 from the data nodes 200, and the associated recovery procedures, to enable the user to implement recovery operations on the unhealthy SDNAS objects 280 via the user interface 255.

In some embodiments, the storage system management application 250 includes API 260 that is configured to issue calls on node API 270 of the data nodes 200, to instruct the data nodes 200 to return a list of unhealthy SDNAS objects. An example method of identifying a set of unhealthy SDNAS objects 280 during an example self-service resolution of unhealthy SDNAS objects is described in greater detail in connection with FIGS. 6 and 7. In some embodiments, the storage system management application API 260 is also configured to issue calls on node API 270 of the data nodes 200, to instruct the data nodes 200 to implement recovery operations on specific unhealthy SDNAS objects 280. An example method of resolving a set of one or more unhealthy SDNAS objects is described in greater detail in connection with FIGS. 6 and 8.

As shown in FIG. 3, in some embodiments the storage system management application 250 generates an API call (arrow 1) to the data node 200 to request a list of unhealthy SDNAS objects 280. The node API 270 receives the API call and generates an API call to the SDNAS API 275 (arrow 2). The SDNAS 205 identifies any unhealthy SDNAS object 280 (arrow 3) and responds to the node API 270 (arrow 4). The list of identified unhealthy SDNAS objects 280 are returned to the storage system management application 250 (arrow 5). In some embodiments, each unhealthy SDNAS object that is identified to the storage system management layer is also associated with a recovery procedure (arrow 5) specifying a set of API calls that node API 270 will need to play on SDNAS API 275 to recover the unhealthy SDNAS object 280.

FIG. 4 is a block diagram of an example portion of a user interface 255 of the storage system management application 250 of FIG. 3, showing a user interface configured to enable self-service resolution of unhealthy SDNAS objects 280, according to some embodiments. It should be understood that user interface designs can vary greatly depending on the particular implementation. Accordingly, the conceptual aspects of the user interface 255 shown in FIG. 4 are merely one example, and the invention is not limited to utilization of this particular user interface design.

In the example shown in FIG. 4, the user interface 255 includes an unhealthy SDNAS object resolution page 400, having a product menu bar 405, and a side bar with feature or page selection controls 410. The product menu may have a series of tabs, for example, or a series of drop-down menus, through which a user is provided with a mechanism that can be used to navigate through the UI to access the unhealthy SDNAS object resolution page 400.

In some embodiments, as shown in FIG. 4, the unhealthy SDNAS object resolution page 400 includes a list of unhealthy SDNAS objects 415 and, for each unhealthy SDNAS object, a recovery action 420. As shown in FIG. 4, in some embodiments the recovery action 420 is an ordered list of SDNAS API calls 425 (API:1, API:2, . . . , API:M) that, when implemented by node API 270 on SDNAS API 275, will enable the node API to effect recovery of the unhealthy SDNAS object. In some embodiments, SDNAS object recovery procedure data structure 265 is maintained by the data node 200, and the recovery procedure 215 is returned by the data node 200 along with the identity of the unhealthy SDNAS object. In some embodiments, the SDNAS object recovery procedure data structure 265 is maintained by the storage system management application 250, and the recovery procedure 215 is determined from the SDNAS object recovery procedure data structure 265 when the list of unhealthy SDNAS objects is received from the data node 200. For example, in some embodiments the recovery action 420 is determined by the storage system management system 250 by selecting the recovery action 420 from the SDNAS object recovery procedure data structure 265 based on an identity of the type of unhealthy SDNAS object 500 and the object state 505.

In some embodiments, the unhealthy SDNAS object resolution page 400 includes the ability for a user to select one or more of the unhealthy SDNAS objects to be recovered. When selected, the recovery action 420 is passed from the storage system management application 250 to the node API 270 to instruct the data node 200 to implement the set of API calls on the SDNAS 205 to implement recovery of the unhealthy SDNAS object. For example, in some embodiments the user can click on one or more of radio boxes 430 to select one or more of the unhealthy SDNAS objects to be recovered. After clicking on one or more of the radio boxes 430, the user can select recover option 450 to initiate recovery of the selected unhealthy SDNAS object. Alternatively, the user can select "schedule" box 440 to schedule the selected unhealthy SDNAS object to be recovered at a later point in time. Optionally, when the "schedule" box is selected, a further dialog, popup, or other control is provided to enable the user to select a particular time or range of times during which the recovery process should be implemented.

In some embodiments the unhealthy SDNAS object resolution page 400 also includes a "select all" option 435, which may be implemented as a radio box, which is configured to designate all listed unhealthy SDNAS objects to be recovered. After selecting the "select all" option 435, when the user selects the "recover" option 450, the storage system management application 250 will issue one or more API calls via API 260 to instruct the data node 200 to implement the recovery procedures for each of the unhealthy SDNAS objects.

In some embodiments, an API call is provided to instruct the node API 270 to implement specified recovery methods on particular SDNAS objects. In some embodiments, the SDNAS object ID and the recovery method are passed as arguments to the API call, to enable a single API call to be used by the storage system management application 250 to recover multiple types of SDNAS objects. One example API might be, for example:

> Recover_Multiple_Unhealthy_SDNAS_Objects(ObjectID #1/RecoveryProcess #1, ObjectID #2/RecoveryProcess #2, . . . , ObjectID #N/RecoveryProcess #N)

where ObjectID is the identity of the unhealthy SDNAS object, and RecoveryProcess is the ordered list of SDNAS API calls 425 to be played by the data node 200 on the SDNAS API 275 to implement recovery of the identified unhealthy SDNAS object. In this instance, a single API call may be passed with multiple arguments identifying different unhealthy SDNAS objects and including separate recovery procedures for each included SDNAS object. In some embodiments, instead of using a single API call for multiple unhealthy SDNAS objects, separate API calls are used-one API call for each unhealthy SDNAS object. For example, one example API might be:

> Recover_Single_Unhealthy_SDNAS_Object(ObjectID/RecoveryProcess)

FIG. 5 is a block diagram of an example SDNAS object recovery procedure data structure for use by the storage system management application 250 of FIG. 3, according to some embodiments. As shown in FIG. 5, in some embodiments a given type of SDNAS object 500 may have more than one type of unhealthy state 505. Different unhealthy states 505, for the same object type 500, may have different recovery methods 510. For example, SDNAS object type=filesystem may have SDNAS object states 1 through N, and each unhealthy object state may have a different SDNAS API recovery sequence 510. For example, as shown in Table 1, a filesystem may be unmounted, offline, corrupted, or 100% full. Each of these unhealthy states 505 may have a different recovery procedure 510, which requires use of a different set of ordered API calls to be implemented on the SDNAS API 275.

In some embodiments, the recovery sequence is determined in advance and stored in the SDNAS object recovery procedure data structure 265. When an object is determined to be in an unhealthy state, the identity of the unhealthy object is returned by the data node 200 (FIG. 3 arrow 5), along with the SDNAS object state 505, and the object type 500 and unhealthy object state 505 are used to implement a lookup in the SDNAS object recovery procedure data structure 265 to obtain the SDNAS API sequence 510 to be used by the storage system management application 250 to instruct the data node 200 to recover the unhealthy SDNAS object.

Figure 6:
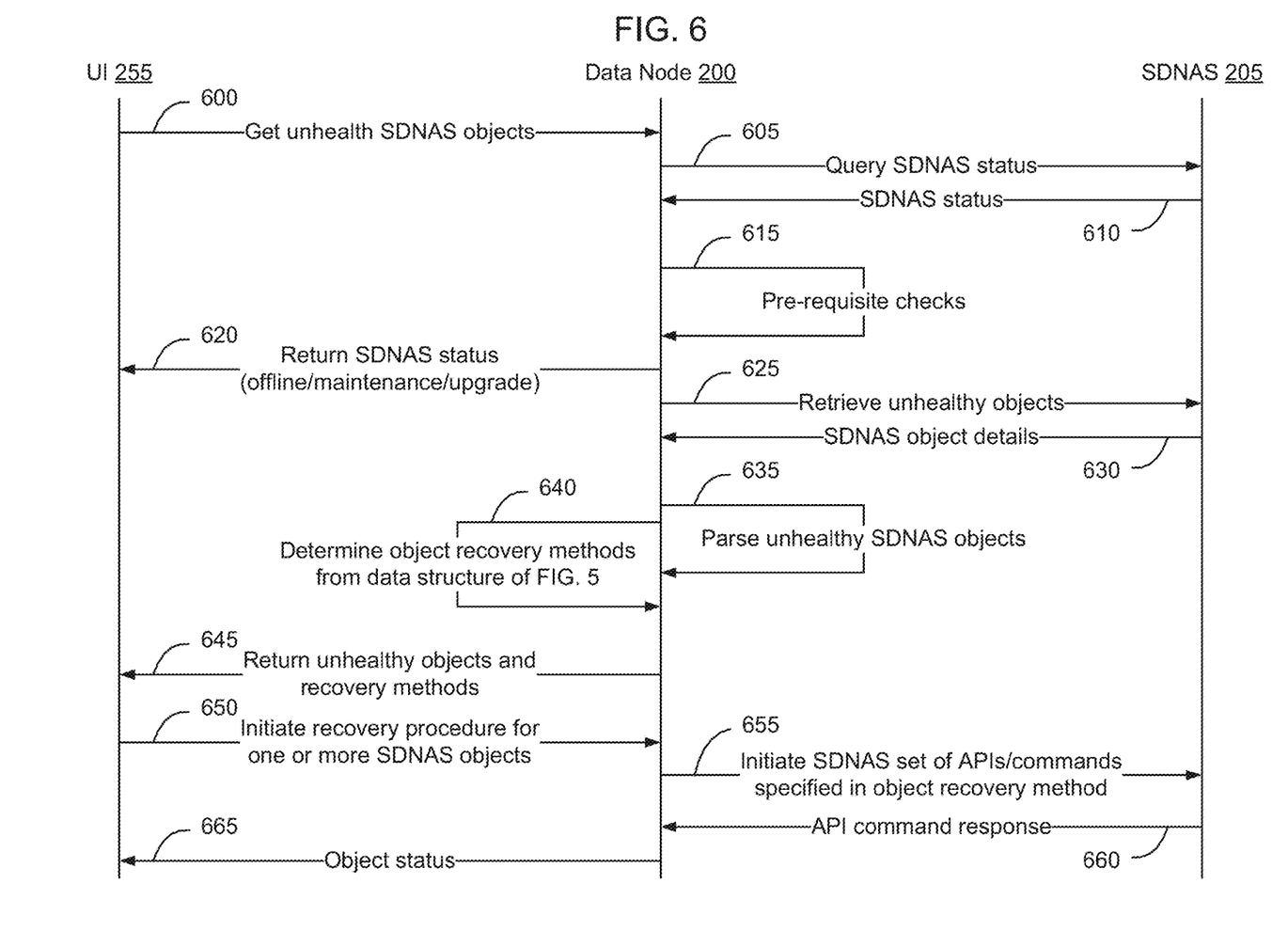
FIG. 6 is a swim lane diagram showing an example process implemented in connection with self-service resolution of unhealthy SDNAS objects, according to some embodiments.

FIG. 6 is a swim lane diagram showing an example process implemented in connection with self-service resolution of unhealthy SDNAS objects, according to some embodiments. As shown in FIG. 6, in some embodiments the user interface 255 sends a request to data node 200 requesting the data node 200 to prepare and return a list of unhealthy SDNAS objects (arrow 600). In response, the data node 200 queries the SDNAS 205 for the status of the SDNAS (arrow 605). The SDNAS may be in a state that would prevent it from accurately reporting the status of the SDNAS objects. For example, the SDNAS 205 may be in the process of being upgraded, may be in a maintenance window, or may otherwise be offline. In these, and possibly other states, the SDNAS 205 may not be able to accurately report the state of the SDNAS objects. Accordingly, checking the status of the SDNAS (arrow 605) prevents attempted recovery of SDNAS objects when the SDNAS 205 itself is not in a healthy state.

In response to receipt of the SDNAS status query (arrow 605), the SDNAS 205 responds with its current SDNAS status (arrow 610). The data node 200 implements a set of pre-requisite checks using the SDNAS response (arrow 615) to determine if the SDNAS 205 is in a state where it is not possible to implement the unhealthy SDNAS object recovery procedures. In some embodiments, in response to a determination at arrow 615 that the SDNAS 205 is offline, in a maintenance window, or being upgraded, the data node 200 notifies the UI (arrow 620) that the SDNAS 205 is not available, and the self-service resolution of unhealthy SDNAS objects ends. Optionally, the data node 200 may periodically poll the SDNAS 205 (arrows 605, 610) to watch for a change in state of the SDNAS 205 to enable the self-service resolution of unhealthy SDNAS objects to continue automatically after the SDNAS 205 comes back online, is finished with maintenance/update, etc.

In response to a determination at arrow 615 that the SDNAS 205 is capable of participating in a process of self-service resolution of unhealthy SDNAS objects, the data node 200 transmits a request to the SDNAS (arrow 625) to retrieve a list of unhealthy objects from the SDNAS 205. The SDNAS 205 identifies all SDNAS objects with a SDNAS status associated with one of the unhealthy states (FIG. 5, block 505), and responds with the details associated with any/all unhealthy SDNAS objects (arrow 630).

In some embodiments, the data node 200 parses the response from the SDNAS 205 (arrow 635) to extract information about the unhealthy SDNAS objects. In embodiments where the SDNAS object recovery procedure data structure 265 is maintained by the data node 200, the data node also determines the recovery method 510 based on the object type 500 and unhealthy object state 505 (arrow 640). The data node 200 then returns the list of unhealthy SDNAS objects and recovery methods (arrow 645). In embodiments where the SDNAS object recovery procedure data structure 265 is maintained by the storage system management system 250, the data node 200 returns the list of unhealthy SDNAS objects (arrow 645) and arrow 640 is instead implemented by UI 255 based on the object type 500 and unhealthy object state 505 after receipt of the list of unhealthy SDNAS objects (after receipt of arrow 645).

The UI then initiates recovery procedures for one or more of the SDNAS objects (arrow 650). In some embodiments, recovery of the one or more of the SDNAS objects (arrow 650) is implemented by sending an API call to the data node 200 identifying the unhealthy SDNAS object 415, and the recovery method 420. The recovery method, in some embodiments, contains an ordered list of API calls 425 to be implemented by the data node 200 on the SDNAS 205 to cause a set of actions to be taken on the unhealthy SDNAS object to restore the SDNAS object to a healthy state.

The data node 200 initiates the set of SDNAS APIs/commands on the SDNAS 205 specified in the object recovery method (instruction arrow 655) and receives a response from the SDNAS 205 (arrow 660). Although FIG. 6 shows a single instruction arrow 655 and single response arrow 660 for ease of illustration, it should be understood that recovery processes may be multiple step processes that may require multiple successive API call/response cycles. For example, to restore the health of a corrupted filesystem, it may be necessary to unmount the filesystem, recover the filesystem, and then mount the recovered filesystem. Each of these actions may require a separate instruction (arrow 655)

and response (arrow 660). Once the recovery process has been completed, the current status of the object is returned to the UI 255 (arrow 665).

Figure 7:
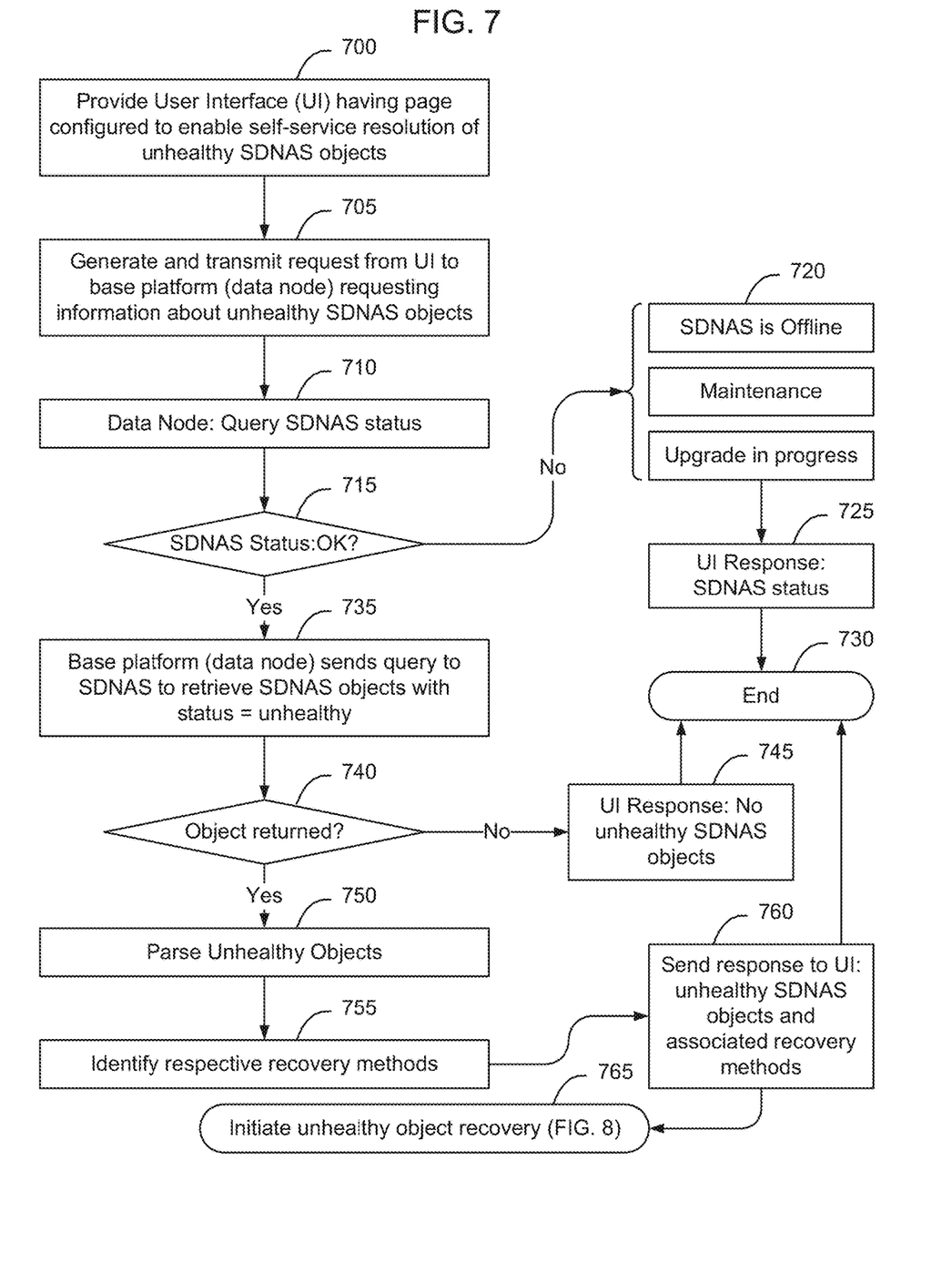
FIG. 7 is a flowchart of an example method of identifying a set of unhealthy SDNAS objects during an example process of resolution of unhealthy self-service SDNAS objects, according to some embodiments.

FIG. 7 is a flowchart of an example method of identifying a set of unhealthy SDNAS objects during an example process of resolution of unhealthy self-service SDNAS objects, according to some embodiments. As shown in FIG. 7, according to some embodiments the User Interface (UI) 255 of a storage system management system 250 is provided with a UI page configured to manage unhealthy SDNAS objects (block 700). FIG. 4 shows an example of a UI page of this nature, but differently designed UI pages might be configured as well depending on the implementation.

According to some embodiments, the UI 255 generates and transmits a request to the base platform (data node 200) requesting information about any unhealthy SDNAS objects on the data node 200 (block 705). The data node 200 queries the SDNAS status (block 710) to determine if the SDNAS is operational (block 715). In response to a determination that the SDNAS status is not OK (a determination of NO at block 715) the data node 200 responds that the SDNAS is not available (block 725). The SDNAS status may be determined to be not OK, for example if the SDNAS is offline, is undergoing maintenance, or is being upgraded (block 720). When the SDNAS is not OK, after notifying the user interface 255 (block 725) the process ends (block 730).

In response to a determination that the SDNAS status is OK (a determination of YES at block 715), the base platform (data node 200) sends a query to the SDNAS 205 to retrieve a list of all SDNAS objects with status=unhealthy. It should be noted that there may be multiple object states that equate with an unhealthy SDNAS object state. The SDNAS checks the status of each SDNAS object and generates a response (block 740).

In instances where the SDNAS determines that there are no unhealthy SDNAS objects (a determination of NO at block 740), the data node 200 generates a response that there are no unhealthy SDNAS objects (block 745) and the process ends (block 730). In response to a receipt by the data node 200 of a response that identifies one or more unhealthy SDNAS objects (a determination of YES at block 740), the data node 200 parses the unhealthy objects (block 750) and identifies respective recovery methods for each of the identified unhealthy SDNAS objects (block 755). The data node 200 then sends a response to the UI 255 containing the list of unhealthy SDNAS objects and associated recovery methods (block 760) and the process ends (block 730). Optionally, the UI can also be used to initiate unhealthy object recovery (block 765), an example of which is described in greater detail herein, for example in connection with FIG. 8.

Figure 8:
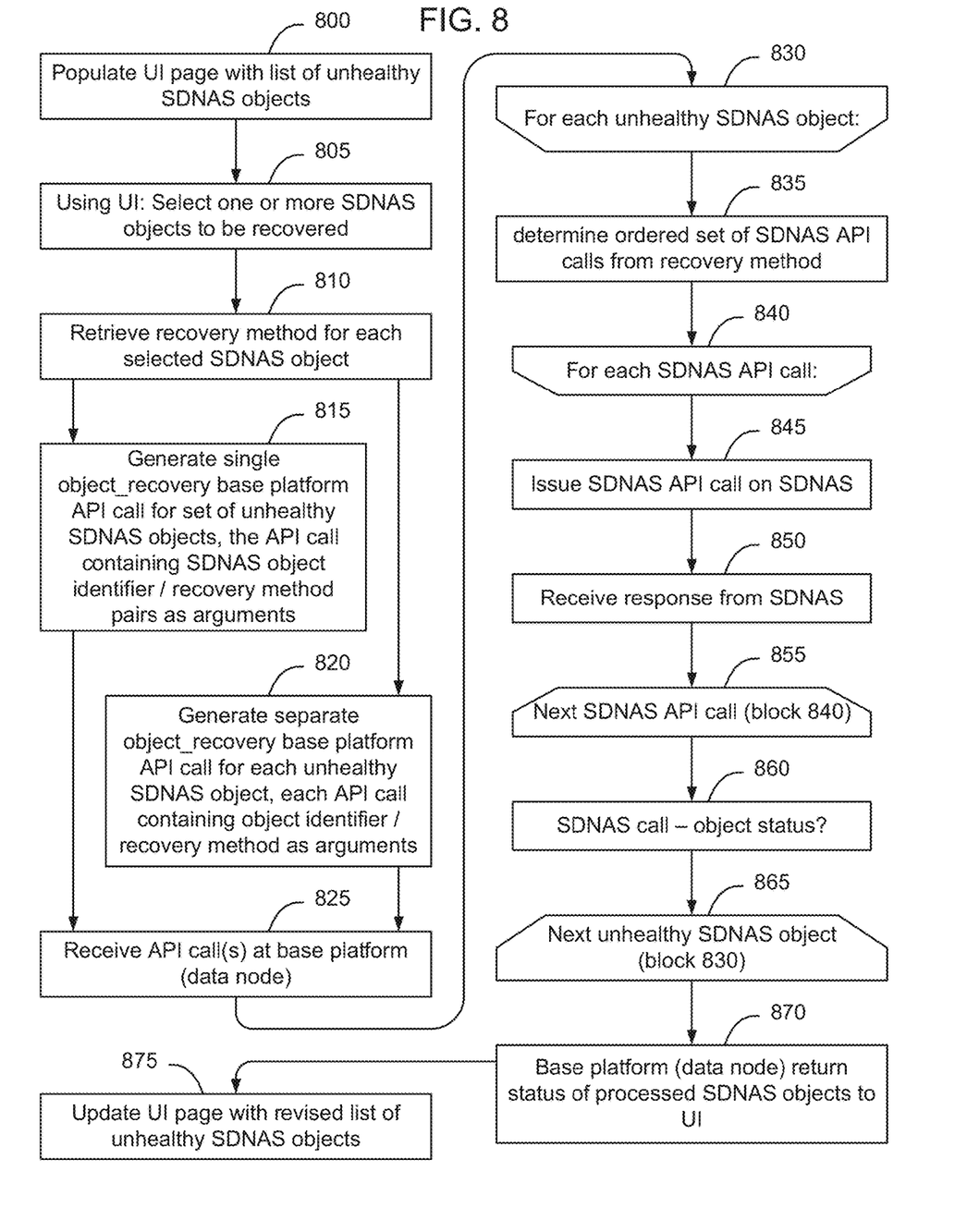
FIG. 8 is a flowchart of an example method of resolving a set of one or more unhealthy SDNAS objects, according to some embodiments.

FIG. 8 is a flowchart of an example method of resolving a set of one or more unhealthy SDNAS objects, according to some embodiments. As shown in FIG. 8, in some embodiments a page of the user interface 255 of the storage system management system 250 is populated with a list of unhealthy SDNAS objects (block 800), for example using the process described in connection with FIG. 7. Using the UI, a user selects one or more of the SDNAS objects to be recovered (block 805). Although FIG. 8 is described in which the user interface 255 receives input (interaction) from a user, it should be understood that in some embodiments the steps of populating the UI page with the list of unhealthy SDNAS objects (block 800) and selecting the objects (block 805) may be automated and not dependent on receipt of user input.

In connection with selecting an unhealthy SDNAS object, the recovery method 420 for each selected SDNAS object is obtained (block 810). In some embodiments obtaining the recovery method 420 is implemented automatically and does not require user input.

If a single unhealthy SDNAS object is selected, a single object recovery base platform API call is generated containing the SDNAS object identifier and recovery method as an argument (block 820). If multiple SDNAS objects are selected, in some embodiments a single object recovery base platform API call containing the multiple SDNAS object identifiers/recovery method pairs is generated (block 815). In other embodiments, the UI generates separate object recovery base platform API calls, one for each unhealthy SDNAS object, in which each API call contains a single SDNAS object identifier and associated recovery method for the identified SDNAS object (block 820).

The data node 200 receives the API call(s) (block 825), and implements a recovery process on the identified SDNAS object(s) (blocks 830-865). In some embodiments, for each SDNAS object (block 830), the data node 200 determines the ordered set of SDNAS API calls specified in the recovery method (block 835). For each SDNAS API call (block 840) the data node 200 issues the SDNAS API call on the SDNAS (block 845) and receives a response from the SDNAS (block 850). The data node 200 then proceeds to implement the next SDNAS API call (block 855). The data node 200 thus implements the recovery process for the unhealthy SDNAS object (blocks 840-855) until all of the SDNAS API calls have been implemented on the SDNAS. In some embodiments, after implementing the recovery process, the data node 200 issues a final SDNAS call to check the status of the SDNAS object (block 860). The data node 200 then selects a next SDNAS object (block 865) until all selected unhealthy SDNAS objects have been recovered. Although FIG. 8 shows recovery of individual unhealthy SDNAS objects proceeding serially, it should be understood that the data node 200 may implement recovery of multiple unhealthy SDNAS objects in parallel, depending on the particular implementation.

The base platform (data node 200) returns the status of all SDNAS objects to the UI 255 (block 870). In response to the status update, the UI page is updated with a revised list of unhealthy SDNAS objects (block 875). Although FIG. 8 shows the status update (block 870) being implemented once, after the set of unhealthy SDNAS objects has been processed by the data node 200, it should be understood that multiple status updates (block 870) may be provided throughout the process (blocks 830-865), which enables the UI page to be updated more frequently (block 875), for example as the state of individual SDNAS objects are changed from the unhealthy state to a healthy state.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of self-service resolution of unhealthy Software Defined Network Attached Storage (SDNAS) objects, comprising:
    determining a state of a SDNAS process by a base platform on which the SDNAS process is implemented, to determine if the SDNAS process is capable of providing accurate information about a set of SDNAS objects used by the SDNAS process;
    in response to a determination that the SDNAS process is capable of providing accurate information about the set of SDNAS objects, querying the SDNAS process for a subset of SDNAS objects having an unhealthy status;
    receiving a response from the SDNAS process, the response identifying the subset of SDNAS objects having the unhealthy status;
    determining a recovery process for each SDNAS object in the subset of SDNAS objects;
    populating an unhealthy SDNAS object resolution page of a user interface to a storage system management application; and
    in response to input to the unhealthy SDNAS object resolution page selecting one of the SDNAS objects of the subset of SDNAS objects, and initiating self-service resolution of the selected one of the SDNAS objects using the recovery process for the selected one of the SDNAS objects; and
    maintaining a SDNAS object recovery procedure data structure by the base platform correlating SDNAS object type, SDNAS unhealthy object state, and SDNAS object recovery procedure methods;
    wherein receiving the response from the SDNAS process and determining the recovery process for each SDNAS object in the subset of SDNAS objects are implemented by the base platform.

2. The method of claim 1, wherein the SDNAS process is implemented in a container on the base platform.

3. The method of claim 2, wherein the SDNAS objects include NAS servers, shared filesystems, and snapshots of the shared filesystems.

4. The method of claim 1, wherein the recovery process specifies an ordered set of API calls to be implemented by the base platform on an API of the SDNAS process to effect resolution of the selected one of the SDNAS objects.

5. The method of claim 1, further comprising transmitting the subset of SDNAS objects and respective recovery process for each SDNAS object in the subset of SDNAS objects from the base platform to the user interface to the storage system management application.

6. The method of claim 1, wherein the user interface to the storage system management application contains a set of controls enabling selection of one unhealthy SDNAS object for recovery or enabling selection of multiple unhealthy SDNAS objects for simultaneous recovery.

7. A method of self-service resolution of unhealthy Software Defined Network Attached Storage (SDNAS) objects, comprising:
    determining a state of a SDNAS process by a base platform on which the SDNAS process is implemented, to determine if the SDNAS process is capable of providing accurate information about a set of SDNAS objects used by the SDNAS process;
    in response to a determination that the SDNAS process is capable of providing accurate information about the set of SDNAS objects, querying the SDNAS process for a subset of SDNAS objects having an unhealthy status;
    receiving a response from the SDNAS process, the response identifying the subset of SDNAS objects having the unhealthy status;
    determining a recovery process for each SDNAS object in the subset of SDNAS objects;
    populating an unhealthy SDNAS object resolution page of a user interface to a storage system management application;
    maintaining a SDNAS object recovery procedure data structure by the user interface correlating SDNAS object type, SDNAS unhealthy object state, and SDNAS object recovery procedure methods; and
    in response to input to the unhealthy SDNAS object resolution page selecting one of the SDNAS objects of the subset of SDNAS objects, and initiating self-service resolution of the selected one of the SDNAS objects using the recovery process for the selected one of the SDNAS objects;
    wherein receiving the response from the SDNAS process is implemented by the base platform; and
    wherein determining the recovery process for each SDNAS object in the subset of SDNAS objects is implemented by the user interface.

8. The method of claim 7, wherein the SDNAS process is implemented in a container on the base platform.

9. The method of claim 8, wherein the SDNAS objects include NAS servers, shared filesystems, and snapshots of the shared filesystems.

10. The method of claim 7, wherein the SDNAS objects include NAS servers, shared filesystems, and snapshots of the shared filesystems.

11. The method of claim 7, wherein the recovery process specifies an ordered set of API calls to be implemented by the base platform on an API of the SDNAS process to effect resolution of the selected one of the SDNAS objects.

12. The method of claim 7, wherein the user interface to the storage system management application contains a set of controls enabling selection of one unhealthy SDNAS object for recovery or enabling selection of multiple unhealthy SDNAS objects for simultaneous recovery.

13. A system for self-service resolution of unhealthy Software Defined Network Attached Storage (SDNAS) objects, comprising:
   one or more processors and one or more storage devices storing instructions that are operable, when executed by the one or more processors, to cause the one or more processors to perform operations comprising:
   determining a state of a SDNAS process by a base platform on which the SDNAS process is implemented, to determine if the SDNAS process is capable of providing accurate information about a set of SDNAS objects used by the SDNAS process;
   in response to a determination that the SDNAS process is capable of providing accurate information about the set of SDNAS objects, querying the SDNAS process for a subset of SDNAS objects having an unhealthy status;
   receiving a response from the SDNAS process, the response identifying the subset of SDNAS objects having the unhealthy status;
   determining a recovery process for each SDNAS object in the subset of SDNAS objects;
   populating an unhealthy SDNAS object resolution page of a user interface to a storage system management application; and
   in response to input to the unhealthy SDNAS object resolution page selecting one of the SDNAS objects of the subset of SDNAS objects, and initiating self-service resolution of the selected one of the SDNAS objects using the recovery process for the selected one of the SDNAS objects;
   wherein the SDNAS process is implemented in a container on the base platform; and
   wherein the SDNAS objects include NAS servers, shared filesystems, and snapshots of the shared filesystems.

14. The system of claim 13, wherein the recovery process specifies an ordered set of API calls to be implemented by the base platform on an API of the SDNAS process to effect resolution of the selected one of the SDNAS objects.

15. The system of claim 13, wherein receiving the response from the SDNAS process and determining the recovery process for each SDNAS object in the subset of SDNAS objects are implemented by the base platform.

16. The system of claim 15, wherein the operations further comprise transmitting the subset of SDNAS objects and respective recovery process for each SDNAS object in the subset of SDNAS objects from the base platform to the user interface to the storage system management application.

17. The system of claim 15, wherein the operations further comprise maintaining a SDNAS object recovery procedure data structure by the base platform correlating SDNAS object type, SDNAS unhealthy object state, and SDNAS object recovery procedure methods.

18. The system of claim 13, wherein the user interface to the storage system management application contains a set of controls enabling selection of one unhealthy SDNAS object for recovery or enabling selection of multiple unhealthy SDNAS objects for simultaneous recovery.

19. The system of claim 13, wherein receiving the response from the SDNAS process is implemented by the base platform; and
   wherein determining the recovery process for each SDNAS object in the subset of SDNAS objects is implemented by the user interface.

20. The system of claim 19, wherein the operations further comprise maintaining a SDNAS object recovery procedure data structure by the user interface correlating SDNAS object type, SDNAS unhealthy object state, and SDNAS object recovery procedure methods.

\* \* \* \* \*